US009799163B1

(12) United States Patent
Kim et al.

(10) Patent No.: US 9,799,163 B1
(45) Date of Patent: Oct. 24, 2017

(54) SYSTEM AND METHOD FOR PROVIDING A CURRENCY MULTIPLIER ITEM IN AN ONLINE GAME WITH A VALUE BASED ON A USER'S ASSETS

(71) Applicant: KABAM, INC., San Francisco, CA (US)

(72) Inventors: John Kim, San Francisco, CA (US); Bryan Tsao, San Carlos, CA (US); Inyang Akpan, San Francisco, CA (US); Kevin Chanthasiriphan, San Francisco, CA (US); Albert Wei, San Francisco, CA (US); David McNeill, San Francisco, CA (US)

(73) Assignee: Aftershock Services, Inc., San Francisco, CA (US)

( * ) Notice: Subject to any disclaimer, the term of this patent is extended or adjusted under 35 U.S.C. 154(b) by 424 days.

(21) Appl. No.: 14/028,422

(22) Filed: Sep. 16, 2013

(51) Int. Cl.
*A63F 13/00* (2014.01)
*G07F 17/32* (2006.01)

(52) U.S. Cl.
CPC ................................ *G07F 17/3244* (2013.01)

(58) Field of Classification Search
CPC .... A63F 13/847; A63F 13/828; A63F 13/825; A63F 13/822; A63F 13/69; A63F 13/85; A63F 13/87; A63F 2300/575; A63F 2300/609; G07F 17/32; G07F 17/34; G07F 17/3244
See application file for complete search history.

(56) References Cited

U.S. PATENT DOCUMENTS

| | | | |
|---|---|---|---|
| 5,816,918 | A | 10/1998 | Kelly |
| 5,933,813 | A | 8/1999 | Teicher |
| 5,964,660 | A | 10/1999 | James |
| 6,142,472 | A | 11/2000 | Kliebisch |
| 6,190,225 | B1 | 2/2001 | Coleman |
| 6,190,255 | B1 | 2/2001 | Thomas |
| 6,347,996 | B1 | 2/2002 | Gilmore |
| 6,402,619 | B1 | 6/2002 | Sato |

(Continued)

FOREIGN PATENT DOCUMENTS

| | | |
|---|---|---|
| KR | 1020130137431 | 12/2013 |
| WO | 0226333 | 1/2002 |

(Continued)

OTHER PUBLICATIONS

'Quest item—WoWWiki—Your guide to the World of Warcraft', printed from http://www.wowwiki.com/Quest_Item, Retrieved on Apr. 16, 2014, 1 page.

(Continued)

*Primary Examiner* — Jasson Yoo
(74) *Attorney, Agent, or Firm* — Sheppard Mullin Richter & Hampton LLP

(57) ABSTRACT

A system and method for providing currency multiplier items to one or more users of an online game is described. A user of an online game may obtain a currency multiplier item by purchase, by award, responsive to one or more actions taken in the online game, and/or by other methods. Use of the currency multiplier item may enable the user to adjust the amount of virtual currency in the inventory in the user's user account, wherein the adjustment to the amount of currency is not provided to the first user prior to use of the currency multiplier item.

19 Claims, 2 Drawing Sheets

(56) References Cited

U.S. PATENT DOCUMENTS

| | | | | |
|---|---|---|---|---|
| 6,561,904 | B2 | 5/2003 | Locke et al. | 463/25 |
| 6,604,008 | B2 | 8/2003 | Chudley | |
| 6,745,236 | B1 | 6/2004 | Hawkins | |
| 6,811,483 | B1 | 11/2004 | Webb | |
| 6,850,900 | B1 | 2/2005 | Hare | |
| 6,928,474 | B2 | 8/2005 | Venkatesan | |
| 7,076,453 | B2 | 7/2006 | Jammes | |
| 7,381,133 | B2 | 6/2008 | Thomas | |
| 7,533,336 | B2 | 5/2009 | Jaffe | |
| 7,660,740 | B2 | 2/2010 | Boone | |
| 7,682,239 | B2 | 3/2010 | Friedman | |
| 7,785,188 | B2 | 8/2010 | Cannon | |
| 7,945,802 | B2 | 5/2011 | Hamilton, II et al. | 713/500 |
| 7,959,507 | B2 | 6/2011 | Cannon | 463/21 |
| 8,010,404 | B1 | 8/2011 | Wu | |
| 8,016,668 | B2 | 9/2011 | Hardy | |
| 8,047,909 | B2 | 11/2011 | Walker | |
| 8,057,294 | B2 | 11/2011 | Pacey | |
| 8,157,635 | B2 | 4/2012 | Hardy | |
| 8,187,101 | B2 | 5/2012 | Herrmann | |
| 8,226,472 | B2 | 7/2012 | Van Luchene | |
| 8,239,487 | B1 | 8/2012 | Hoffman | |
| 8,272,956 | B2 | 9/2012 | Kelly | |
| 8,282,491 | B2 | 10/2012 | Auterio | |
| 8,287,383 | B1 | 10/2012 | Etter | |
| 8,287,384 | B2 | 10/2012 | Auterio | |
| 8,292,743 | B1 | 10/2012 | Etter | |
| 8,313,372 | B2 | 11/2012 | Naicker | |
| 8,317,601 | B1 | 11/2012 | Luciano, Jr. | |
| 8,332,260 | B1 | 12/2012 | Mysen | |
| 8,348,716 | B2 | 1/2013 | Ganz | |
| 8,348,767 | B2 | 1/2013 | Mahajan | |
| 8,360,858 | B2 | 1/2013 | LaRocca | |
| 8,360,867 | B2 | 1/2013 | Van Luchene | |
| 8,366,544 | B2 | 2/2013 | Walker | |
| 8,371,925 | B2 | 2/2013 | Bonney | |
| 8,376,826 | B2 | 2/2013 | Katz | |
| 8,401,913 | B2 | 3/2013 | Alivandi | |
| 8,439,759 | B1 | 5/2013 | Mello | |
| 8,512,150 | B2 | 8/2013 | Herrmann | |
| 8,636,591 | B1 | 1/2014 | Hawk | |
| 8,696,428 | B1 | 4/2014 | Post | |
| 8,715,068 | B2 | 5/2014 | Arnone | |
| 8,777,754 | B1 | 7/2014 | Santini | |
| 8,790,185 | B1 | 7/2014 | Caldarone | |
| 8,821,260 | B1 | 9/2014 | DeSanti | |
| 8,851,978 | B1 | 10/2014 | Koh | |
| 8,920,243 | B1 | 12/2014 | Curtis | |
| 8,961,319 | B1 | 2/2015 | Pieron | |
| 8,968,067 | B1 | 3/2015 | Curtis | |
| 9,138,639 | B1 | 9/2015 | Ernst | |
| 9,257,007 | B2 | 2/2016 | Santini | |
| 2002/0059397 | A1 | 5/2002 | Feola | |
| 2002/0072412 | A1 | 6/2002 | Young | |
| 2002/0095327 | A1 | 7/2002 | Zumel | |
| 2002/0151351 | A1 | 10/2002 | Baerlocher | |
| 2002/0165794 | A1 | 11/2002 | Ishihara | |
| 2003/0027619 | A1 | 2/2003 | Nicastro | |
| 2003/0032476 | A1 | 2/2003 | Walker | |
| 2003/0102625 | A1 | 6/2003 | Katz | |
| 2003/0109301 | A1 | 6/2003 | Chudley | |
| 2003/0157978 | A1 | 8/2003 | Englman | |
| 2003/0174178 | A1 | 9/2003 | Hodges | |
| 2003/0216167 | A1 | 11/2003 | Gauselmann | |
| 2004/0002387 | A1 | 1/2004 | Grady | |
| 2004/0068451 | A1 | 4/2004 | Lenk | |
| 2004/0215524 | A1 | 10/2004 | Parkyn | |
| 2004/0224745 | A1* | 11/2004 | Bregenzer | G07F 17/32 463/16 |
| 2004/0267611 | A1 | 12/2004 | Hoerenz | |
| 2005/0096117 | A1 | 5/2005 | Katz | |
| 2005/0114223 | A1 | 5/2005 | Schneider | |
| 2005/0165686 | A1 | 7/2005 | Zack | |
| 2005/0192087 | A1 | 9/2005 | Friedman | |
| 2005/0209008 | A1 | 9/2005 | Shimizu | |
| 2005/0227751 | A1 | 10/2005 | Zanelli | |
| 2005/0255914 | A1 | 11/2005 | McHale | |
| 2005/0277474 | A1 | 12/2005 | Barry | |
| 2006/0030407 | A1 | 2/2006 | Thayer | |
| 2006/0063587 | A1 | 3/2006 | Manzo | |
| 2006/0116196 | A1 | 6/2006 | Vancura | |
| 2006/0155597 | A1 | 7/2006 | Gleason | |
| 2006/0200370 | A1 | 9/2006 | Ratliff | |
| 2006/0287029 | A1 | 12/2006 | Yoshinobu | |
| 2007/0077988 | A1 | 4/2007 | Friedman | |
| 2007/0129139 | A1 | 6/2007 | Nguyen | |
| 2007/0281285 | A1 | 12/2007 | Jayaweera | |
| 2008/0009344 | A1 | 1/2008 | Graham | |
| 2008/0032787 | A1 | 2/2008 | Low | |
| 2008/0058092 | A1 | 3/2008 | Schwartz et al. | 463/25 |
| 2008/0113706 | A1 | 5/2008 | OHalloran | |
| 2008/0113815 | A1 | 5/2008 | Weingardt | |
| 2008/0124353 | A1 | 5/2008 | Brodeur | |
| 2008/0154798 | A1 | 6/2008 | Valz | |
| 2008/0176625 | A1 | 7/2008 | Kelly | |
| 2008/0194318 | A1 | 8/2008 | Kralicky | |
| 2008/0207306 | A1 | 8/2008 | Higbie | |
| 2008/0214295 | A1 | 9/2008 | Dabrowski | |
| 2008/0227525 | A1 | 9/2008 | Kelly et al. | 463/20 |
| 2008/0234043 | A1 | 9/2008 | McCaskey | |
| 2008/0248867 | A1 | 10/2008 | Englman | |
| 2008/0275786 | A1 | 11/2008 | Gluck | |
| 2008/0300045 | A1 | 12/2008 | Ratcliff | |
| 2008/0318668 | A1 | 12/2008 | Ching | |
| 2009/0011812 | A1 | 1/2009 | Katz | |
| 2009/0017886 | A1 | 1/2009 | McGucken | |
| 2009/0036199 | A1 | 2/2009 | Myus | |
| 2009/0048918 | A1 | 2/2009 | Dawson | |
| 2009/0061982 | A1* | 3/2009 | Brito | G07F 17/32 463/20 |
| 2009/0124353 | A1 | 5/2009 | Collette et al. | 463/25 |
| 2009/0204907 | A1 | 8/2009 | Finn | |
| 2009/0210301 | A1 | 8/2009 | Porter | |
| 2009/0234710 | A1 | 9/2009 | Belgaied Hassine | |
| 2010/0004048 | A1 | 1/2010 | Brito | |
| 2010/0035689 | A1 | 2/2010 | Altshuler | |
| 2010/0041472 | A1 | 2/2010 | Gagner | |
| 2010/0041481 | A1 | 2/2010 | Smedley | |
| 2010/0050088 | A1 | 2/2010 | Neustaedter | |
| 2010/0094841 | A1 | 4/2010 | Bardwil | |
| 2010/0174593 | A1 | 7/2010 | Cao | |
| 2010/0198653 | A1 | 8/2010 | Bromenshenkel | |
| 2010/0227675 | A1 | 9/2010 | Luxton | |
| 2010/0228606 | A1 | 9/2010 | Walker | |
| 2010/0240444 | A1 | 9/2010 | Friedman | |
| 2010/0241491 | A1 | 9/2010 | Eglen | |
| 2010/0241492 | A1 | 9/2010 | Eglen | |
| 2011/0092271 | A1 | 4/2011 | Nguyen | |
| 2011/0092273 | A1 | 4/2011 | Cerbini | |
| 2011/0113353 | A1 | 5/2011 | Koh | |
| 2011/0118002 | A1* | 5/2011 | Aoki | G07F 17/32 463/20 |
| 2011/0145040 | A1 | 6/2011 | Zahn | |
| 2011/0151957 | A1 | 6/2011 | Falciglia | |
| 2011/0218033 | A1 | 9/2011 | Englman et al. | 463/25 |
| 2011/0256921 | A1 | 10/2011 | Pacey | |
| 2011/0263324 | A1 | 10/2011 | Ganetakos | |
| 2011/0275438 | A9 | 11/2011 | Hardy | |
| 2011/0281638 | A1 | 11/2011 | Bansi | |
| 2011/0282764 | A1 | 11/2011 | Borst | |
| 2011/0300923 | A1 | 12/2011 | Van Luchene | |
| 2011/0319152 | A1 | 12/2011 | Ross | |
| 2012/0011002 | A1 | 1/2012 | Crowe | |
| 2012/0034973 | A1 | 2/2012 | Frank | |
| 2012/0040743 | A1 | 2/2012 | Auterio | |
| 2012/0040761 | A1 | 2/2012 | Auterio | |
| 2012/0042282 | A1 | 2/2012 | Wong | |
| 2012/0047002 | A1 | 2/2012 | Patel | |
| 2012/0059730 | A1 | 3/2012 | Jensen | |
| 2012/0094743 | A1 | 4/2012 | Odom | |
| 2012/0101886 | A1 | 4/2012 | Subramanian | |
| 2012/0108306 | A1 | 5/2012 | Munsell | |
| 2012/0109785 | A1 | 5/2012 | Karlsson | |

(56) References Cited

U.S. PATENT DOCUMENTS

2012/0115593 A1* 5/2012 Vann ........................ G07F 17/34
463/26
2012/0122589 A1 5/2012 Kelly
2012/0129590 A1 5/2012 Morrisroe
2012/0130856 A1 5/2012 Petri
2012/0142429 A1 6/2012 Muller
2012/0157193 A1 6/2012 Arezina
2012/0166380 A1 6/2012 Sridharan
2012/0178515 A1 7/2012 Adams
2012/0178529 A1 7/2012 Collard
2012/0197874 A1 8/2012 Zatkin
2012/0202570 A1 8/2012 Schwartz et al. ............... 463/10
2012/0203669 A1 8/2012 Borsch
2012/0215667 A1 8/2012 Ganz
2012/0221430 A1 8/2012 Naghmouchi
2012/0231891 A1 9/2012 Watkins
2012/0244945 A1 9/2012 Kolo et al. ...................... 463/42
2012/0244950 A1 9/2012 Braun
2012/0245988 A1 9/2012 Pace
2012/0289315 A1 11/2012 Van Luchene
2012/0289330 A1 11/2012 Leydon
2012/0289346 A1 11/2012 Van Luchene
2012/0295699 A1 11/2012 Reiche
2012/0296716 A1 11/2012 Barbeau
2012/0302329 A1 11/2012 Katz
2012/0309504 A1 12/2012 Isozaki
2012/0311504 A1 12/2012 VanOs
2013/0005437 A1 1/2013 Bethke
2013/0005438 A1 1/2013 Ocko
2013/0005466 A1 1/2013 Mahajan
2013/0005473 A1 1/2013 Bethke
2013/0005480 A1 1/2013 Bethke
2013/0006736 A1 1/2013 Bethke
2013/0012304 A1 1/2013 Cartwright
2013/0013404 A1 1/2013 Suprock
2013/0013459 A1 1/2013 Kerr
2013/0072278 A1 3/2013 Salazar
2013/0079087 A1 3/2013 Brosnan
2013/0090173 A1 4/2013 Kislyi
2013/0095914 A1 4/2013 Allen
2013/0124361 A1 5/2013 Bryson
2013/0173393 A1 7/2013 Calman
2013/0210511 A1 8/2013 LaRocca
2013/0217489 A1 8/2013 Bronstein Bendayan
2013/0226733 A1 8/2013 Evans
2013/0244767 A1 9/2013 Barclay
2013/0288757 A1 10/2013 Guthridge
2013/0290147 A1 10/2013 Chandra
2013/0303726 A1 11/2013 Mozzarelli
2013/0310164 A1 11/2013 Walker
2014/0004884 A1 1/2014 Chang
2014/0033262 A1 1/2014 Anders
2014/0038679 A1 2/2014 Snow
2014/0067526 A1 3/2014 Raju
2014/0067544 A1 3/2014 Klish
2014/0073436 A1 3/2014 Takagi
2014/0087864 A1 3/2014 Togashi
2014/0089048 A1 3/2014 Bruich
2014/0100020 A1 4/2014 Carroll
2014/0106858 A1 4/2014 Constable
2014/0128137 A1 5/2014 Balise
2014/0157314 A1 6/2014 Roberts
2014/0206452 A1 7/2014 Bambino
2014/0243072 A1 8/2014 Santini
2014/0274359 A1 9/2014 Helava
2014/0295958 A1 10/2014 Shono
2014/0315616 A1 10/2014 Avin
2014/0329585 A1 11/2014 Santini
2014/0337259 A1 11/2014 Lamb
2015/0011286 A1 1/2015 Kim
2015/0019349 A1 1/2015 Milley
2015/0031440 A1 1/2015 Desanti
2015/0087378 A1 3/2015 Louie
2015/0306494 A1 10/2015 Pieron
2015/0335995 A1 11/2015 McLellan
2015/0352436 A1 12/2015 Pieron

FOREIGN PATENT DOCUMENTS

WO 2013013281 1/2013
WO 2013116904 1/2013
WO 2015013373 1/2015
WO 2015168187 11/2015
WO 2015179450 11/2015
WO 2015196105 12/2015

OTHER PUBLICATIONS

“Cataclysm Guide: Guild Advancement—Wowhead”, http://www.wowhead.com/guide=cataclysm&guilds, printed Dec. 5, 2013, 4 pages.

“Kabam Community Forums > Kingdoms of Camelot > Kingdoms of Camelot Open Discussion > Open Discussion : Tournament of Might Prizes / Main Discussion thread”, printed from http://community.kabam.com/forums/archive/index.php/t-43273.html, Oct. 24, 2011, 23 pages.

“Rest—WoWWiki—Your guide to the World of Warcraft”, printed from http://www.wowwiki.com/Rest, May 19, 2014, 2 pages.

Super Mario Bros. 3, NES Gameplay, http://www.youtube.com/watch?v=82TL-Acm4ts, 1 page.

Super Mario Bros. 3, StrategyWiki, the video game walkthrough and strategy guide, http://strategywiki.org/wiki/Super_Mario_Bros._3, 4 pages.

Super Mario Bros. 3 Review, Nintendo for NES, Feb. 1990, pp. 1-4.

TFF Challenge—UC Davis, http://tffchallenge.com/team/uc-davis/, printed Jan. 15, 2014, 12 pages.

“Building Structures”. War2.warcraft.org. Online. Accessed via the Internet. Accessed Aug. 9, 2014. <URL: http://war2.warcraft.org/strategy/verybasics/building.shtml>, 3 pages.

“Clash of Clans”. Wikipedia.org. Online. Accessed via the Internet. Accessed Aug. 9, 2014. <URL: http://en.wikipedia.org/wiki/Clash of Clans>, 3 pages.

“Gem calculation formulas”, forum.supercell.net. Online. Accessed via the Internet. Accessed Aug. 9, 2014. <URL: http://forum.supercell.net/showthread.php/23028-Gem-calculation-formulas>, 3 pages.

“How Town Hall to Level 4”. Forum.supercell.net. Online. Jan. 31, 2013. Accessed via the Internet. Accessed Feb. 21, 2015. URL:http://forum.supercell.net/showthread.php/15052-How-Town-Hall-to-Level-4, 2 pages.

“Lotro-Wiki.com” (evidence in regards to “Lord of the Rings Oline” MMORPG game), latest Dec. 22, 2011, http://lotro-wiki.com/index.php/Main_Page) (hereinafter referred to as Lotro>, http://lotro-wiki.com/index.php?title=LOTRO_Store&oldid=396550, http://lotro-wiki.com/index.php?title=Quest:A_Little_Extra_Never_Hurts_--_Part_1&oldid=399597, http://lotro-wiki.com/index.php?title=Quest:A_Little_Extra_Never_Hurts_--.

“Warcraft II: Tides of Darkness”. Wikipedia.org. Online. Accessed via the Internet. Accessed Aug. 9, 2014. <URL: http://en.wikipedia.org/wiki/Warcraft_II:_Tides_of_Darkness>, 10 pages.

City Coins. CityVille Wikia. Online. Accessed via the Internet. Accessed Aug. 9, 2014. <URL: http://cityville.wikia.com/wiki/City_Coins>, 2 pages.

“I don’t have enough resources/builders to upgrade anything in my village, what can I do?” gamesupport.supercell.net. Online. Accessed via the Internet. Accessed Aug. 9, 2014. <URL: https://gamesupport.supercell.net/hc/en-us/articles/421482-I-don-t-have-enough-resources-builders-to-upgrade-anything-in-my-village-what-can-I-do >, Apr. 23, 2014, 9 pages.

“Behavioural Analytics & Campaigning”, http://lotaris.com/behavioural._analytics_and._Campaigning.htm, screenshot access date May 24, 2012 2:21 PM, 1 page.

“Digital River World Payments and Lotaris Partner to Extend Mobile Application Licensing and Monetization Capabilities to Software Publishers”, Business Wire Press Release, http://www.marketwatch.com/story/digital-river-world-payments-and-

(56) References Cited

OTHER PUBLICATIONS lotaris . . . , posted San Francisco, Mar. 27, 2012 (Business Wire), 8:30 a.m. EDT, printed May 24, 2012 2:32 PM, 3 pages.
FriskyMongoose "Happy Island Updates", available Jun. 12, 2012 from https://web.archive.org/web/20120612004417/http://friskymongoose.com/happy-island-updates-new-attractions-decorations-and-limited-edition-item-bundles/, 7 pages.
Gaia "Black Friday Bundle" available on Nov. 23, 2011, from http://www.gaiaonline.com/forum/community-announcements/black-friday-big-bundles-rare-items/t.76127933/, 5 pages.
Hamari, Juho, "Game Design as Marketing: How Game Mechanics Create Demand for Virtual Goods", available on vol. 5, Issue 1, 2010, retrieved from Int. Journal of Business Science and Applied Management—http://www.business-and-management.org/library/2010/5_1--14-29-Hamari,Lehdonvirta.pdf, on May 26, 2015, 16 pages.
MMO Site "Rose Online Launches the Newest in Game Feature"; available Aug. 11, 2011 from https://web.archive.org/web/20110811231226/http://news.mmosite.com/content/2011-06-21/rose_online_launches_the_newest_in_game_feature.1.shtml, 3 pages.
TFWiki "teamfortress wiki" available Nov. 5, 2011 retrieved from https://web.archive.org/web/20111105044256/http://wiki.teamfortress.com/wiki/Loadout, 4 pages.
UBC, "Theory of Auctions" available on Mar. 24, 2012 from https://web.archive.org/web/20120324204610/http:/montoya.econ.ubc.ca/Econ522/auctions.pdf, slide 5, Para. 1.3, 19 pages.
Wiki "Gaia online"', available on Sep. 9, 2011, https://web.archive.org/ web/20110927210155/http://en.wikipedia.org/wiki/Gaia_Online, 8 pages.
"Digital River World Payments and Lotaris Partner to Extend Mobile Application Licensing and Monetization Capabilities to Software Publishers", LOTARIS Press Release, http://www.lotaris.com/digital_river_world_payments_and_lotaris_partne . . . , posted Tuesday, Mar. 27, 2012, screenshop access date May 24, 2012, 2:19 PM, 1 page.
Ozeagle, "What happens if . . . answers about account types" on Lotro forum, Jan. 18, 2011,<https://www.lotro.com/forums/showthread.php?377885-What-happens-if-answers-about-the-account-types> (16 pgs).
<http://lotro-wiki.com/index.php?title=Ouest:A_Little_Extra_Never_Hurts_--_Part_2&oldid=399366>, <http://lotrowiki.com/index.php ?title=Getting_Started&oldid=349681 >. Links are to used articles. (7 pgs) Feb. 26, 2014.
"Lotro-Wiki.com" (evidence in regards to "Lord of the Rings Oline" MMORPG game),latest Dec. 22, 2011,<http://lotrowiki.com/index.php/Main_Page)(hereinafter referred to as Lotro>,<http://lotrowiki.com/index.php? title=LOTRO_Store&oldid=396550>,<http://lotrowiki.com/index.php?title=Ouest:A_Little_Extra_Never_Hurts_--_Part_1 &oldid=399597> (28 pgs).
Diablo 2, Blizzard Entertainment, Mar. 23, 2009, manual and online website, http:// web.archive.Org/web/20090323171356/http://classic.battle.net/diablo 2exp/items/basics.shtml, 51 pages.
Dreamslayer's Enchanting and Upgrading Guide—With Pictures:D and Explanations, URL: forums.elswordonline.com/Topic5673.aspx [Retrieved Feb. 21, 2013], 10 pages.
Elsword, Dec. 27, 2007, KOG Studios, Guide posted Mar. 17, 2011, http:// forums.elswordonline.com/topic5673.aspx,http://en.wikipedia.org/wiki/Elsword, 16 pages.
Gem System—Street Fighter X Tekken, http://www.streetfighter.com/us/sfxtk/features/gem-system, printed Nov. 6, 2012, 6 pages.
MapleStory, Internet guide: http://maplestory.nexon.net/guides/game-play/systems/00Flk/http://maplestory.nexon.net/guides/game-play/systems/00Flk/http://maplestory.nexon.net/guides/game-play/systems/00FFV, Sep. 28, 2012, 12 pages.
MapleStory—Guides—Equipment Upgrading 101: Potentials, URL: maplestory.nexon.net/guides/game-play/systems/OOFlj/ [Retrieved Jun. 24, 2013], 5 pages.
MapleStory—Guides—Equipment Upgrading 101: Scrolls, URL: maplestory.nexon.net/guides/game-play/systems/OOFFV/#mitigating [Retrieved Jun. 24, 2013], 4 pages.
Path of Exile, Internet posting: http://web.archive.org/web/20120606004658/http://www.pathofexile.com/forum/view-thread/12056, Nov. 16, 2011, 52 pages.
Profession—WoWWiki—Your guide to the World of Warcraft, URL: http://www.wowwiki.com/Profession, printed Nov. 6, 2012, 8 pages.
The Arreat Summit—Items: Basic Item Information, URL: web.archive.org/web/20090323171356/http://classic.battle.net/diablo2exp/items/basics.shtml [Retrieved Feb. 21, 2013], 3 pages.
Katkoff, Michail, "Clash of Clans—the Winning Formula", Sep. 16, 2012, retrieved from Internet on Sep. 30, 2015 from URL <http://www.deconstructoroffun.com/2012/09/clash-of-clans-winning-formula.html>, 13 pages.
MapleStory—Guides—Equipment Upgrading 101: Enhancements, URL: maplestory.nexon.net/guides/game-play/systems/OOFlk; [Retrieved Jun. 24, 2013] 3 pages.
Elsword—Wikipedia, the free encyclopedia, URL: en.wikipedia.org/wiki/Elsword [Retrieved Feb. 21, 2013], 6 pages.
Path of Exile—Forum—Beta General Discussion—Unique Items Compendium 60/71 URL: web.archive.org/web/20120608004658/http://www.pathofexile.com/forum/view-thread/12056 [Retrieved Jun. 24, 2013], 52 pages.
"Treasure Chest Game" written by Zelda Wiki, the Zelda encyclopedia; published on or before Oct. 17, 2012; accessible andprinted from URL <http://web.archive.org/web/20121017085058/http://zeldawiki.org/ Treasure_Chest_Game>, 4 pages.
"GuildHousing System—FlyFF Wiki", http://flyff-wiki.gpotato.com/wiki/Guild_Housing_System, printed Dec. 5, 2013, 5 pages.

* cited by examiner

SYSTEM AND METHOD FOR PROVIDING A CURRENCY MULTIPLIER ITEM IN AN ONLINE GAME WITH A VALUE BASED ON A USER'S ASSETS

FIELD

The disclosure relates to providing a currency multiplier item in an online game with a value based on a user's assets.

BACKGROUND

Various techniques for providing awards to users of an online game are known. For example, the provision of static awards to a user of an online game is known. The static award may comprise a value that is independent of a user's assets.

Conventional systems, however, suffer from various drawbacks and inefficiencies relating to providing awards to one or more users of the online game. For example, a static award provided by a conventional system may comprise a multiplier to be applied to an amount previously awarded. Another static award may comprise, for example, a multiplier to be applied to game play credits for a user. Conventional systems may also normalize a multiplier to be applied to an award based on a difficulty of the game played in which the award was provided. Other conventional systems may provide a multiplier for an award based on a user's play in the online game. Conventional systems fail, however, to award prizes that are dependent upon a user's assets or provide multipliers to an award with a value determined based on the user's assets.

SUMMARY

One aspect of the disclosure relates to providing currency multiplier items to one or more users of an online game. A user of an online game may obtain a currency multiplier item by purchase, by award, responsive to one or more actions taken in the online game, and/or by other methods. Use of the currency multiplier item may enable the user to adjust the amount of virtual currency in the inventory in the user's user account, wherein the adjustment to the amount of currency is not provided to the first user prior to use of the currency multiplier item.

A system configured to facilitate providing a currency multiplier item to one or more users of an online game may include one or more processors configured to execute compute program modules. The program modules may comprise a space module, a user module, an item management module, and/or other modules.

The space module may be configured to execute an instance of a virtual space. The space module may be configured to implement the instance of the virtual space to facilitate participation by the one or more users in the online game within the virtual space by effectuating presentation of views of the virtual space to the one or more users by one or more client computing platforms.

A user module may be configured to maintain one or more user accounts for the respective one or more users. The one or more user accounts may comprise a first user account for a first user. A first user account may include, for example, an inventory of virtual currency available to the first user for expenditure in the virtual space, one or more virtual items available to the first user for use in the game, and/or other virtual resources of the first user. In some implementations, the inventory may comprise a currency multiplier item available for use by the first user.

An item management module may be configured to facilitate use of virtual items from the inventory of the first user in the virtual space. Use of the currency multiplier item may adjust the amount of virtual currency in the inventory in the first user account. An adjustment to the amount of currency in the inventory of the first user may not be provided to the first user prior to use of the currency multiplier item.

In some implementations, a computer-implemented method may provide currency multiplier items to one or more users of an online game. The computer-implemented method may be implemented in a computer system comprising one or more physical processors. The method may comprise, for example, executing an instance of a virtual space; implementing the instance of the virtual space to effectuate presentation of views of the virtual space to the one or more users by the one or more client computing platforms; maintaining one or more user accounts for the respective one or more users, the one or more user accounts comprising a first user account for a first user, the first user account including an inventory of virtual currency available to the first user for expenditure in the virtual space, and virtual items available to the first user for use in the game, wherein the inventory comprises a currency multiplier item available for use by the first user; and facilitating use of virtual items from the inventory of the first user in the virtual space, wherein use of the currency multiplier item adjusts the amount of virtual currency in the inventory in the first user account, wherein the adjustment to the amount of currency is not provided to the first user prior to use of the currency multiplier item.

In some implementations, a non-transitory electronic storage media may store information related to providing currency multiplier items to one or more users of an online game. The stored information may comprise, for example, a memory configured to store information related to the one or more users of an online game and instructions configured to cause a client computing platform to: execute an instance of a virtual space; implement the instance of the virtual space to effectuate presentation of views of the virtual space to the one or more users by the one or more client computing platforms; maintain one or more user accounts for the respective one or more users, the one or more user accounts comprising a first user account for a first user, the first user account including an inventory of virtual currency available to the first user for expenditure in the virtual space, and virtual items available to the first user for use in the game, wherein the inventory comprises a currency multiplier item available for use by the first user; facilitate use of virtual items from the inventory of the first user in the virtual space, wherein use of the currency multiplier item adjusts the amount of virtual currency in the inventory in the first user account, wherein the adjustment to the amount of currency is not provided to the first user prior to use of the currency multiplier item.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
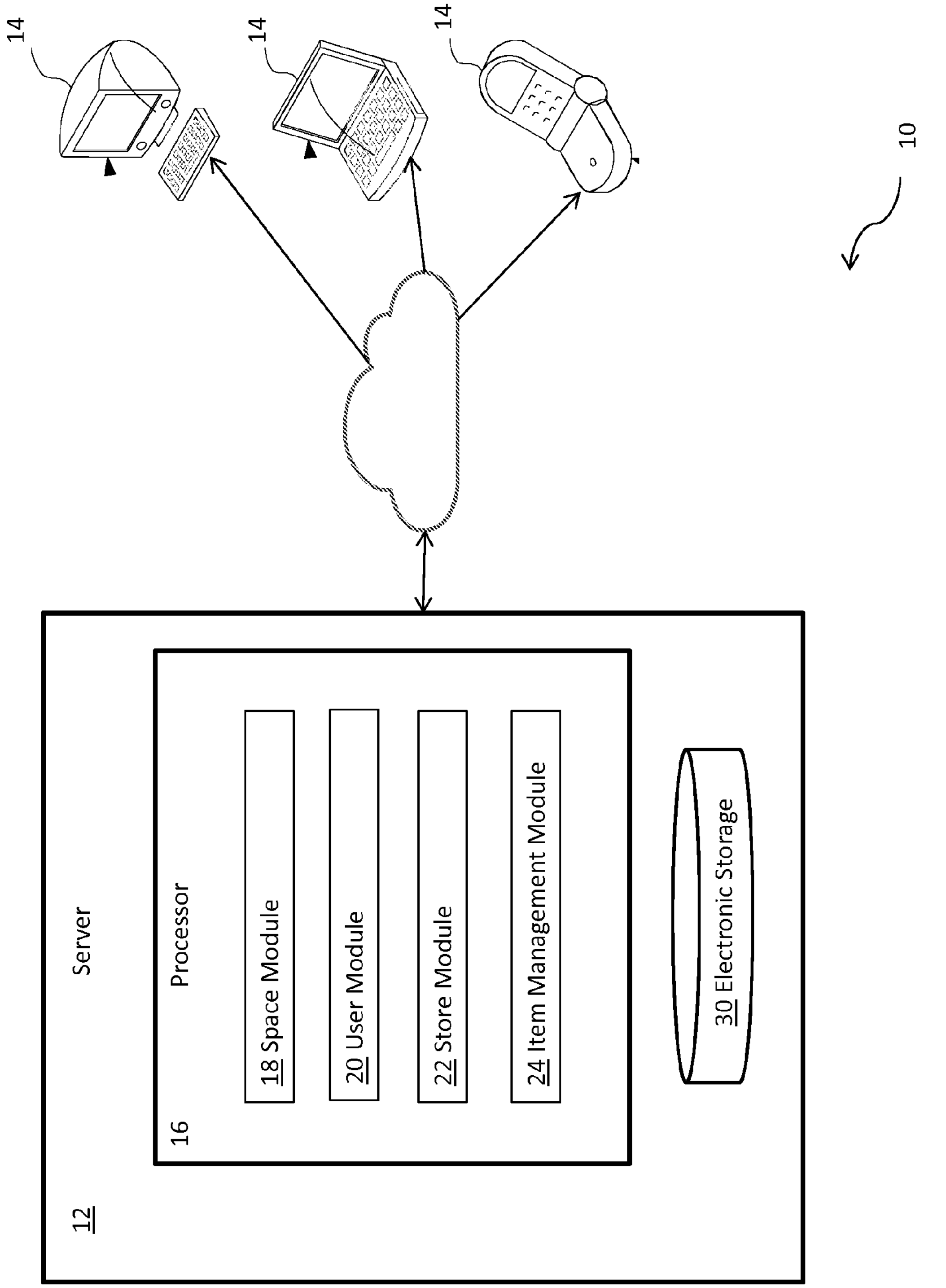
FIG. 1 provides an exemplary illustration of a system 10 configured to facilitate providing currency multiplier items to one or more users of an online game, according to various aspects of the invention.

FIG. 1 provides an exemplary illustration of a system 10 configured to facilitate providing currency multiplier items to one or more users of an online game, according to various aspects of the invention. In some implementations, system 10 may include a server 12. The server 12 may be configured to communicate with one or more client computing platforms 14 according to a client/server architecture. The users may access system 10 and/or the virtual space via client computing platforms 14.

The server 12 may be configured to execute one or more computer program modules. The computer program modules may include one or more of a space module 18, a user module 20, a store module 22, an item management module 24, and/or other modules.

The space module 18 may be configured to implement the instance of the virtual space executed by the computer modules to determine state of the virtual space. The state may then be communicated (e.g., via streaming visual data, via object/position data, and/or other state information) from server 12 to client computing platforms 14 for presentation to users. The state determined and transmitted to a given client computing platform 14 may correspond to a view for a user character being controlled by a user via the given client computing platform 14. The state determined and transmitted to a given client computing platform 14 may correspond to a location in the virtual space. The view described by the state for the given client computing platform may correspond, for example, to the location from which the view is taken, the location the view depicts, and/or other locations, a zoom ratio, a dimensionality of objects, a point-of-view, and/or view parameters of the view. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which state of the virtual space is determined by space module 18 is not intended to be limiting. The space module 18 may be configured to express the virtual space in a more limited, or more rich, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 18, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that represents an individual user. The user character may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user.

The user may have an "inventory" of virtual resources, including, for example, one or more virtual assets, virtual currency, one or more virtual items, and/or other virtual assets that are available for the user to use (e.g., by manipulation of a user character, other user controlled element, and/or other items) within the virtual space. A virtual asset of the user may comprise, for example, a user-controlled element.

A virtual asset may comprise one or more attributes associated with the user-controlled element, where an individual attribute may comprise a value associated with an individual level of one or more sequentially ordered levels of value for the individual attribute.

Virtual currency may be used by the user for expenditure within the virtual space. For example, virtual currency may be used to purchase items within the virtual space, to upgrade a virtual item of the user, to upgrade a level of game play within the virtual space, and/or for other expenditures. In some implementations, virtually currency in an inventory of a user may also be measured to determine whether a user may be eligible for an upgrade, a bonus, and/or other award within the virtual space that takes into account an amount of virtual currency available to the user. Virtual currency may be acquired by a user through one or more of purchase for consideration having a real money value, gift, earned through gameplay, and/or acquired in other ways. Virtual currency may only be exchangeable as consideration in transactions within the game, and/or may be used or consumed outside of transactions.

A virtual item of the user may comprise, for example, a virtual object that may be used by the user within the virtual space. A virtual item may affect a virtual asset of the user, the virtual space in which the online game is played, game logic of the online game, an amount of virtual currency in the inventory of the user, and/or other components of the online game. Examples of virtual items include valuables (money, valuable metals or gems, etc.), weapons, spell components, defense components, armor. wood, stone, herbs, water, ores, animals, monsters, bosses, NPCs, building materials, portions, and/or other virtual objects.

The users may participate in the instance of the virtual space by controlling one or more of the available user controlled elements in the virtual space. Control may be exercised through control inputs and/or commands input by the users through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through space module 18).

The user module 20 may be configured to access and/or manage one or more user accounts and/or user information associated with users of the system 10. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), information related to an inventory of virtual assets, virtual currency, virtual items, and/or other virtual resources of users, virtual space usage information, demographic information associated with users, interaction history among users in the virtual space, information stated by users, purchase information of users, browsing history of users, a client computing platform identification associated with a user, a phone number associated with a user, and/or other information related to users.

The user accounts may include at least a first user account for a first user and a second user account for a second user. The first user account may comprise, for example, information related to an inventory of virtual resources of the first user. The inventory of virtual resources may comprise, for example, one or more virtual assets, virtual currency, one or more virtual items, and/or other virtual resources of the first user. In some implementations, the one or more virtual items in the inventory may comprise a currency multiplier item available for use.

In some implementations, a currency multiplier item of a user may comprise an indicator that indicates that the currency multiplier item is to be applied to an entire amount of virtual currency of the user. In some implementations, the currency multiplier item may indicate a percentage of virtual currency, a stochastically determined random amount, and/or other amount of virtual currency of the user to which the currency multiplier item is to be applied. The currency multiplier item may comprise a multiplier that comprises a number by which the virtual currency of the user is to be multiplied. Upon use and/or consumption of the currency multiplier item, the amount of virtual currency in the inventory of the user may be adjusted to be an amount resulting from the multiplication of the existing amount of virtual currency prior to use of the currency multiplier item by the multiplier of the currency multiplier item. The multiplier may be an integer, a number less than one, a fraction, and/or any other number. In some implementations, the currency multiplier item may be a negative number, such that application of the currency multiplier item may require the user to forfeit other virtual resources with a value equivalent to an amount of the application of the currency multiplier to the amount of virtual currency to which the currency multiplier is applied. In some implementations, the multiplier may be stochastically determined such that the amount of virtual currency to which the currency multiplier item is applied is stochastically adjusted. In some implementations, the multiplier may be determined based on a monetization value of the user in the online game.

Store module 22 may be configured to present a store interface to the users of the game space. The store interface may present offers to users to purchase one or more virtual items. The store module 22 may enable a user to purchase virtual items for a respective plurality of costs. In some implementations, the store module 22 may present one or more currency multiplier items for purchase by a user. In some implementations, a cost of a currency multiplier item may be a percentage of an amount of virtual currency in an inventory of a user.

In some implementations, a cost of the first currency multiplier item may not be relative to an amount of the multiplier of the first currency multiplier item. For example, a first currency multiplier item available for purchase may be associated with a first multiplier and a second currency multiplier item available for purchase may be associated with a second multiplier greater than the first multiplier. A first cost of the first currency multiplier item may be same or less than a cost of the second currency multiplier item. Accordingly, a user may not be aware of an amount by which a currency multiplier item may affect a virtual currency of the user based solely on a cost of the currency multiplier item.

In some implementations, a currency multiplier item available for purchase may indicate whether the currency multiplier item is pre-associated with a multiplier or whether the currency multiplier item may be applied to stochastically adjust a virtual currency of a user. In some implementations, a currency multiplier item may not indicate whether the whether the currency multiplier item is pre-associated with a multiplier or whether the currency multiplier item may be applied to stochastically adjust a virtual currency of a user.

In some implementations, a user may obtain a currency multiplier item by purchase via the store interface presented by the store module 22.

In some implementations, the currency multiplier item may be obtained by a user during game play. For example, a user may obtain the currency multiplier item as a prize in the game. The user may obtain the currency multiplier item for achieving a subsequent level in game play. In some examples, the user may obtain the currency multiplier item for achieving the subsequent level in game play while maintaining a predetermined level of virtual assets. In another example, the user may obtain the currency multiplier item based on a relationship, affiliation, and/or other association of the user in the game space. In yet another example, the user may obtain the currency multiplier item as a bonus item after purchasing a predetermined number of items and/or spending a predetermined amount of virtual currency via the store interface presented by the store module 22.

In some implementations, the user may obtain the currency multiplier item based on the game logic of the online game. The game logic may comprise, for example, a decision tree including one or more of: information relating to a plurality of actions available to the user based on the game state, information relating to a plurality of consequences associated with the plurality of respective actions available and based on the game state, a plurality of requirements associated with the plurality of respective actions and based on the game state, and/or other information related to the online game.

In some implementations, the currency multiplier item may be obtained based upon a monetization level of the user in the online game. For example, responsive to a user having a monetization level in the online game above a predetermined threshold (e.g., a threshold set by a game administrator and/or other predetermined threshold), the currency multiplier item may become available to be obtained in the game by a method described herein and/or another method of obtaining the currency multiplier item in the online game.

In some implementations, one or more currency multiplier items of different attributes may be available. Currency multiplier items of different attributes may comprise, for example, a currency multiplier item with an integer multiplier, a currency multiplier item with a negative multiplier, a currency multiplier item with different amounts of virtual currency to which the item is applied, a currency multiplier item configured to stochastically adjust virtual currency, and/or other attributes. The availability of a currency multiplier item of a particular type may depend upon a level of skill of the user in the game, a level of game play of the user, an existing amount of virtual currency of the user, game logic of the online game, monetization level of the user, and/or other characteristics of the user in the online game.

In some implementations, the currency multiplier item may be applied to one or more virtual items available to the user. The currency multiplier item may be applied to one or more virtual items by adding additional virtual items to the inventory of the user. For example, responsive to the currency multiplier comprising a multiplier, use of the currency multiplier item may cause an amount of a first virtual item in the inventory to be multiplied by the multiplier.

An item management module 24 may be configured to facilitate use of virtual items from the inventory of the user in the virtual space. Use of the currency multiplier item may adjust the amount of virtual currency in the inventory in the user account. An adjustment to the amount of currency in the inventory of the user may not be provided to the user prior to use of the currency multiplier item. In some implementations, the item management module 24 may be configured to remove the currency multiplier item from the inventory of the user responsive to the use of the currency multiplier item. For example, the item management module 24 may be configured to consumer the currency multiplier item responsive to use of the currency multiplier item by removing the currency multiplier item from the inventory of the user.

The item management module 24 may be configured to apply the currency multiplier to an amount of virtual currency indicated by the indicator of the currency multiplier item. As indicated above, the amount of virtual currency may be an entire amount of virtual currency of the user, a percentage of virtual currency, a stochastically determined amount of virtual currency, and/or another amount of virtual currency to which the currency multiplier item is to be applied.

The item management module 24 may be configured to adjust the amount of virtual currency of the user by a multiplier of the currency multiplier item, responsive to the currency multiplier item comprising the multiplier. Upon use and consumption of the currency multiplier item, the item management module 24 may be configured to adjust the amount of virtual currency in the inventory of the user to be an amount resulting from the multiplication of the existing amount of virtual currency prior to use of the currency multiplier item by the multiplier of the currency multiplier item. As mentioned above, the multiplier may be an integer, a number less than one, a fraction, a negative number, and/or any other number.

In some implementations, the multiplier may be stochastically determined such that the item management module 24 may stochastically adjust the amount of virtual currency to which the currency multiplier item is applied. For example, upon activation of the currency multiplier item, the item management module 24 may be configured to stochastically determine the multiplier of the currency multiplier item. The item management module 24 may be configured to determine the multiplier based on one or more of: a monetization level of the user in the online game, a level of game play of the user, a skill level of the user, a length of time the user has been playing the game, whether the currency multiplier was awarded to the user, random selection, and/or other criteria.

In some implementations, the item management module 24 may be configured to stochastically determine the multiplier by multiplying the multiplier determined based on one or more of the criteria by a random number. For example, for an individual criteria (or a combination of one or more categories), the item management module 24 may determine a set of potential multipliers based on that criteria. In another example, the set of potential multipliers may be a set of pre-defined numbers. The pre-defined numbers may be set, for example, by a game administrator.

The item management module 24 may obtain individual probabilities for the individual potential multipliers in the set of potential multipliers. The item management module 24 may select a multiplier from the set of potential multipliers based on the probabilities associated with the respective individual probabilities. In some implementations, the item management module 24 may select the multiplier from the set of potential multipliers based on the respective associated probabilities and/or based on a randomly generated number. For example, the item management module 24 may multiply the probability associated with an individual potential multiplier by a randomly generated number. In some implementations, a different random number may be generated for each potential multiplier in the set of potential multipliers. The item management module 24 may select a potential multiplier based on the multiplication of the probability associated with the potential multiplier and the randomly generated number.

In some implementations, the item management module 24 may stochastically determine criteria to use in determining multipliers. The criteria may be associated with respective criteria numbers. The criteria numbers may be randomly assigned integers, may be assigned based on priority of the criteria, may be set by a game administrator, and/or may otherwise be assigned. A number of criteria to be selected may be determined by a game administrator, may be obtained from storage 30, and/or may otherwise be determined. The item management module 24 may stochastically select one or more criteria in a manner similar to the selection of the potential multiplier for the currency multiplier item.

In some implementations, the item management module 24 may apply the currency multiplier item to one or more virtual items available to the user, responsive to the currency multiplier indicating that the item is to applied to one or more virtual items. In some implementations, the one or more virtual items may be predetermined. In some implementations, responsive to the currency multiplier indicating that one or more items may be selected, the item management module 24 may receive, from the user, information relating to respective one or more virtual items in the inventory of the user to which the currency multiplier item is to be applied. The item management module 24 may be configured to apply the currency multiplier item to one or more virtual items by adding additional virtual items to the inventory of the user. For example, responsive to the currency multiplier comprising a multiplier, use of the currency multiplier item may cause the item management module 24 to adjust an amount of a first virtual item in the inventory such that it is multiplied by the multiplier.

In some implementations, the server 12, client computing platforms 14, and/or other components of the system 10 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which servers 12, client computing platforms 14, and/or other components of the system 10 may be operatively linked via some other communication media.

A given client computing platform 14 may include one or more processors configured to execute computer program modules. The computer program modules may be configured to enable an expert or user associated with the given client computing platform 14 to interface with system 10 and/or other components of the system 10, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

The server 12 may include electronic storage 30, one or more processors 16, and/or other components. The server 12 may include communication lines, or ports to enable the exchange of information with a network and/or other computing platforms. Illustration of server 12 in FIG. 1 is not intended to be limiting. The server 12 may include a plurality of hardware, software, and/or firmware components operating together to provide the functionality attributed herein to server 12. For example, server 12 may be implemented by a cloud of computing platforms operating together as server 12.

Electronic storage 30 may comprise electronic storage media that electronically stores information. The electronic storage media of electronic storage 30 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 30 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 30 may include one or more virtual storage resources (e.g., cloud storage, a virtual private network, and/or other virtual storage resources). Electronic storage 30 may store software algorithms, information determined by processor 16, information received from server 12, information received from client computing platforms 14 and/or other information that enables server 12 to function as described herein.

Processor(s) 16 is configured to provide information processing capabilities in server 12. As such, processor 16 may include one or more of a digital processor, an analog processor, a digital circuit designed to process information, an analog circuit designed to process information, a state machine, and/or other mechanisms for electronically processing information. Although processor 16 is shown in FIG. 1 as a single entity, this is for illustrative purposes only. In some implementations, processor 16 may include a plurality of processing units. These processing units may be physically located within the same device, or processor 16 may represent processing functionality of a plurality of devices operating in coordination. The processor 16 may be configured to execute modules 18, 20, 22, 24, and/or other modules. Processor 16 may be configured to execute modules 18, 20, 22, 24, and/or other modules by software; hardware; firmware; some combination of software, hardware, and/or firmware; and/or other mechanisms for configuring processing capabilities on processor 16.

It should be appreciated that although modules 18, 20, 22, 24, and/or other modules are illustrated in FIG. 1 as being co-located within a single processing unit, in implementations in which processor 16 includes multiple processing units, one or more of modules 18, 20, 22, 24, and/or other modules may be located remotely from the other modules. The description of the functionality provided by the different modules 18, 20, 22, 24, and/or other modules described below is for illustrative purposes, and is not intended to be limiting, as any of modules 18, 20, 22, 24, and/or other modules may provide more or less functionality than is described. For example, one or more of modules 18, 20, 22, 24, and/or other modules may be eliminated, and some or all of its functionality may be provided by other ones of modules 18, 20, 22, 24, and/or other modules. As another example, processor 16 may be configured to execute one or more additional modules that may perform some or all of the functionality attributed below to one of modules 18, 20, 22, 24, and/or other modules.

Figure 2:
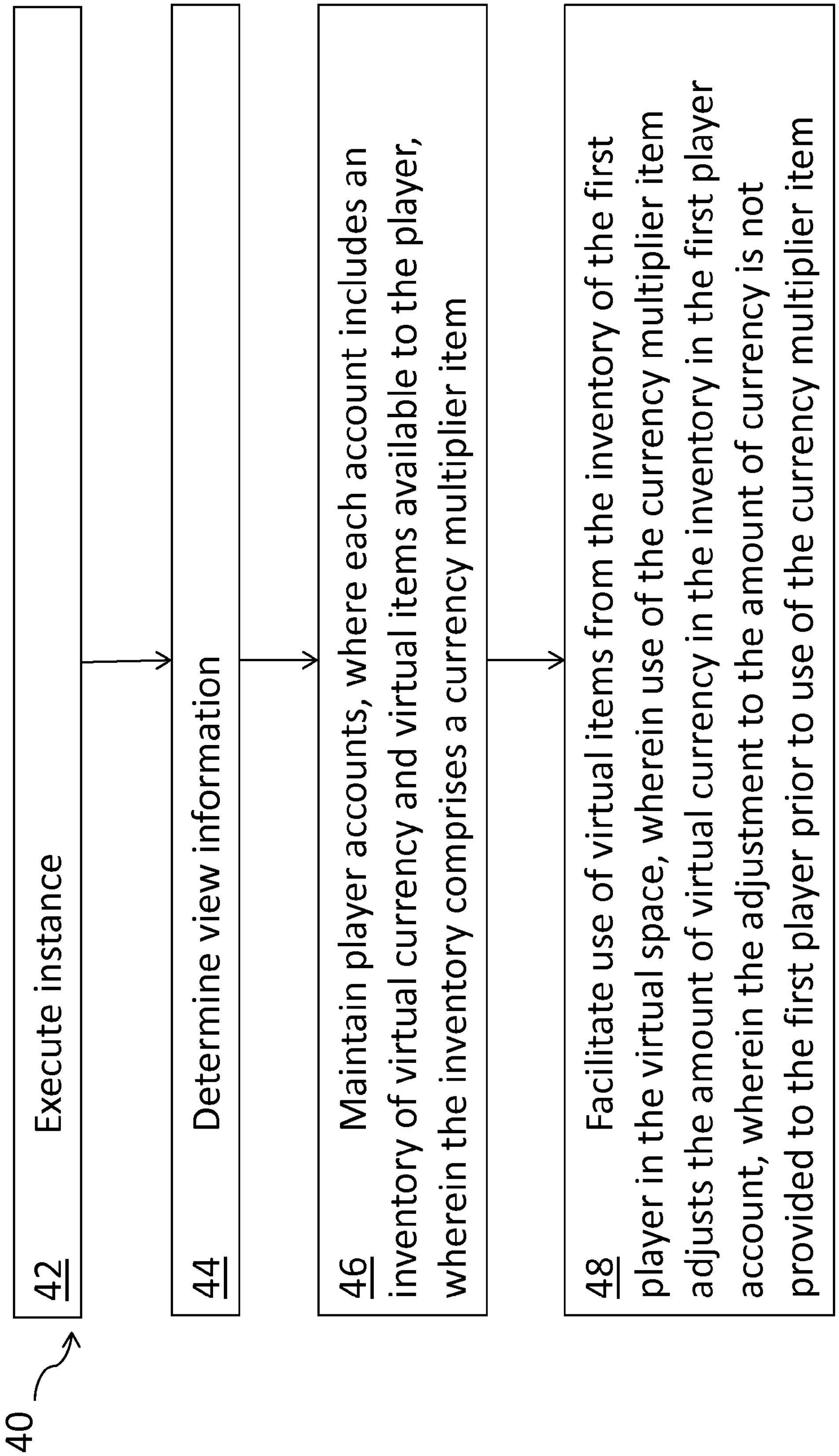
FIG. 2 illustrates an exemplary method of providing currency multiplier items to one or more users of an online game, according to various aspects of the invention.

FIG. 2 illustrates a method 40 of facilitating provision of currency multiplier items to one or more users of an online game, according to various aspects of the invention. The operations of method 40 presented below are intended to be illustrative. In some embodiments, method 40 may be accomplished with one or more additional operations not described, and/or without one or more of the operations discussed. Additionally, the order in which the operations of method 40 are illustrated in FIG. 2 and described below is not intended to be limiting.

In some embodiments, method 40 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 40 in response to instructions stored electronically on an electronic storage medium. The one or more processing devices may include one or more devices configured through hardware, firmware, and/or software to be specifically designed for execution of one or more of the operations of method 40.

At an operation 42, an instance of a virtual space may be executed. In some implementations, operation 42 may be performed by a space module the same as or similar to space module 16 (shown in FIG. 1 and described above).

At an operation 44, the executed instance of the virtual space may be implemented to determine view information. The view information may define views to be presented to users via client computing platforms. In some implementations, operation 44 may be performed by a space module the same as or similar to space module 16 (shown in FIG. 1 and described above).

At an operation 46, user accounts may be maintained, wherein a user account may include an inventory of virtual currency and virtual items available for the user. The inventory for the user may comprise a currency multiplier item available for use by the user. In some implementations, operation 46 may be performed by a user module the same as or similar to user module 18 (shown in FIG. 2 and described herein).

At operation 48, use of virtual items from the inventory may be facilitated. For example, use of the currency multiplier item may adjust the amount of virtual currency in the inventory of the user account, where the adjustment may not be provided to the user prior to use of the currency multiplier item. In some implementations, operation 48 may be performed by an item management module the same as or similar to item management module 24 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to facilitate providing currency multiplier items to one or more users of an online game, the system comprising:

one or more processors configured by machine-readable instructions to:

execute an instance of a virtual space, and to implement the instance of the virtual space to facilitate participation by the one or more users in the online game within the virtual space by effectuating presentation of views of the virtual space to the one or more users via one or more client computing platforms;

maintain one or more user accounts for the respective one or more users, the one or more user accounts comprising a first user account for a first user, the first user account including an inventory of virtual currency available to the first user for expenditure in the virtual space, and virtual items available to the first user for use in the game, wherein the inventory comprises a currency multiplier item available for use by the first user wherein the currency multiplier item comprises a multiplier; and facilitate use of virtual items from the inventory of the first user in the virtual space, wherein use of the currency multiplier item adjusts an entire amount and/or percentage first portion of the entire amount of virtual currency that is in the inventory in the first user account prior to use of the currency multiplier item by multiplying the amount of virtual currency contained in the inventory of the first user prior to use of the currency multiplier item by the multiplier, wherein the adjustment to the amount of currency is not provided to the first user prior to use of the currency multiplier item.

2. The system of claim 1, wherein use of the currency multiplier item adjusts the amount of virtual currency in the inventory by stochastically adjusting the amount of virtual currency.

3. The system of claim 1, wherein the multiplier may be an integer value.

4. The system of claim 1, wherein the multiplier may be less than 1.

5. The system of claim 1, wherein the multiplier may be determined based on a monetization value associated with the user.

6. The system of claim 1, wherein the one or more processors are further configured by machine-readable instructions to present a store interface to the users, wherein the store interface presents a plurality of virtual items to the one or more users to purchase for a respective plurality of costs, the plurality of virtual items comprising the currency multiplier item.

7. The system of claim 1, wherein the one or more processors are configured by machine-readable instructions to:

consume the currency multiplier item responsive to use of the currency multiplier item; wherein consuming the currency multiplier item comprises removing the currency multiplier item from the inventory of the user.

8. The system of claim 1, wherein use of the currency multiplier item adjusts the virtual items available to the first user by adding additional virtual items to the inventory of the first user.

9. The system of claim 1, wherein the currency multiplier item comprises a multiplier, and wherein use of the currency multiplier item multiplies an amount of a first virtual item in the inventory by the multiplier.

10. A computer-implemented method of providing currency multiplier items to one or more users of an online game, the method being implemented in a computer system comprising one or more physical processors, the method comprising:

executing an instance of a virtual space;

implementing the instance of the virtual space to effectuate presentation of views of the virtual space to the one or more users via the one or more client computing platforms;

maintaining one or more user accounts for the respective one or more users, the one or more user accounts comprising a first user account for a first user, the first user account including an inventory of virtual currency available to the first user for expenditure in the virtual space, and virtual items available to the first user for use in the game, wherein the inventory comprises a currency multiplier item available for use by the first user wherein the currency multiplier item comprises a multiplier; and facilitating use of virtual items from the inventory of the first user in the virtual space, wherein use of the currency multiplier item adjusts an entire amount and/ or percentage first portion of the entire amount of virtual currency that is in the inventory in the first user account prior to use of the currency multiplier item by multiplying the amount of virtual currency contained in the inventory of the first user prior to use of the currency multiplier item by the multiplier, wherein the adjustment to the amount of currency is not provided to the first user prior to use of the currency multiplier item.

11. The method of claim 10, wherein use of the currency multiplier item adjusts the amount of virtual currency in the inventory by stochastically adjusting the amount of virtual currency.

12. The method of claim 10, wherein the multiplier may be an integer value.

13. The method of claim 10, wherein the multiplier may be less than 1.

14. The method of claim 10, wherein the multiplier may be determined based on a monetization value associated with the user.

15. The method of claim 10, further comprising:

presenting a store interface to the users, wherein the store interface presents a plurality of virtual items to the one or more users to purchase for a respective plurality of costs, the plurality of virtual items comprising the currency multiplier item.

16. The method of claim 10, further comprising:

consuming the currency multiplier item responsive to use of the currency multiplier item, wherein consuming the currency multiplier item comprises removing the currency multiplier item from the inventory of the user.

17. The method of claim 10, wherein use of the currency multiplier item adjusts the virtual items available to the first user by adding additional virtual items to the inventory of the first user.

18. The method of claim 17, wherein the currency multiplier item comprises a multiplier, and wherein use of the currency multiplier item multiplies an amount of a first virtual item in the inventory by the multiplier.

19. A non-transitory electronic storage media storing information related to providing currency multiplier items to one or more users of an online game, the stored information comprising:

a memory configured to store information related to the one or more users of an online game;

instructions configured to cause a client computing platform to:

execute an instance of a virtual space;

implement the instance of the virtual space to effectuate presentation of views of the virtual space to the one or more users via the one or more client computing platforms;

maintain one or more user accounts for the respective one or more users, the one or more user accounts comprising a first user account for a first user, the first user account including an inventory of virtual currency available to the first user for expenditure in the virtual space, and virtual items available to the first user for use in the game, wherein the inventory comprises a currency multiplier item available for use by the first user wherein the currency multiplier item comprises a multiplier; and facilitate use of virtual items from the inventory of the first user in the virtual space, wherein use of the currency multiplier item adjusts an entire amount and/or percentage first portion of the entire amount of virtual currency that is in the inventory in the first user account prior to use of the currency multiplier item by multiplying the amount of virtual currency contained in the inventory of the first user prior to use of the currency multiplier item by the multiplier, wherein the adjustment to the amount of currency is not provided to the first user prior to use of the currency multiplier item.

* * * * *